United States Patent
Ng et al.

(10) Patent No.: US 12,524,371 B2
(45) Date of Patent: Jan. 13, 2026

(54) ENHANCED HARVARD ARCHITECTURE REDUCED INSTRUCTION SET COMPUTER (RISC) WITH DEBUG MODE ACCESS OF INSTRUCTION MEMORY WITHIN A UNIFIED MEMORY SPACE

(71) Applicant: High Tech Technology Limited, Hong Kong (HK)

(72) Inventors: Chik Wai (David) Ng, Hong Kong (HK); Ka Lok (Roy) Ng, Hong Kong (HK); Yat Him (Hugo) Wong, Hong Kong (HK); Tze Fan Wong, Hong Kong (HK); King Yeung (Sunny) Chan, Hong Kong (HK); Ho Ming (Steve) Chim, Hong Kong (HK); Wai Kei (Timothy) Or, Hong Kong (HK); Chi Hong Chan, Hong Kong (HK)

(73) Assignee: High Tech Technology Limited, Hong Kong (HK)

( * ) Notice: Subject to any disclaimer, the term of this patent is extended or adjusted under 35 U.S.C. 154(b) by 51 days.

(21) Appl. No.: 18/584,167

(22) Filed: Feb. 22, 2024

(65) Prior Publication Data

US 2025/0272096 A1    Aug. 28, 2025

(51) Int. Cl.
*G06F 15/78* (2006.01)
*G06F 11/362* (2025.01)

(52) U.S. Cl.
CPC ...... *G06F 15/7817* (2013.01); *G06F 11/3648* (2013.01)

(58) Field of Classification Search
CPC .......... G06F 11/00; G06F 11/22; G06F 11/26; G06F 11/3648; G06F 11/3656; G06F 9/30043; G06F 15/7817; G06F 13/4022
See application file for complete search history.

(56) References Cited

U.S. PATENT DOCUMENTS

| | | | |
|---|---|---|---|
| 6,052,774 A * | 4/2000 | Segars | G06F 11/3656 714/39 |
| 9,665,486 B2 | 5/2017 | Habermann et al. | |
| 9,910,767 B2 | 3/2018 | Waidhofer et al. | |
| 2007/0106884 A1 | 5/2007 | Bracamontes | |
| 2007/0300046 A1 | 12/2007 | Alfano et al. | |

(Continued)

*Primary Examiner* — David J. Huisman
*Assistant Examiner* — Emilio Alcantara-Ramos
(74) *Attorney, Agent, or Firm* — gPatent LLC; Stuart T. Auvinen

(57) ABSTRACT

A Harvard-architecture computer simultaneously reads instructions using an instruction bus and accesses data over a separate data bus. A debug module has an external interface to an external debugger that initiates a debugging session by setting a debug bit in a debug mode register. When the debug bit is set, a first mux disconnects an instruction pointer and an instruction buffer from the instruction bus and instead connects the data bus to the instruction bus. A second mux disconnects a load/store unit in an execution core from the instruction bus and instead connects the debug module to the instruction bus. The external debugger sees a unified memory space and writes addresses to the debug module that are sent through the second mux to access the data memory, and instruction addresses are sent through the second mux and the first mux to the instruction memory to read or write instructions.

18 Claims, 8 Drawing Sheets

(56) References Cited

U.S. PATENT DOCUMENTS

| | | | | |
|---|---|---|---|---|
| 2009/0089547 | A1* | 4/2009 | Moyer | G06F 9/3861 |
| | | | | 712/205 |
| 2009/0144511 | A1* | 6/2009 | Julicher | G06F 9/35 |
| | | | | 711/E12.001 |
| 2013/0198566 | A1* | 8/2013 | Bastimane | G06F 11/26 |
| | | | | 714/E11.169 |
| 2016/0062862 | A1* | 3/2016 | Moyer | G06F 11/1048 |
| | | | | 714/33 |
| 2022/0179770 | A1* | 6/2022 | Nishiyama | G06F 11/2736 |

* cited by examiner

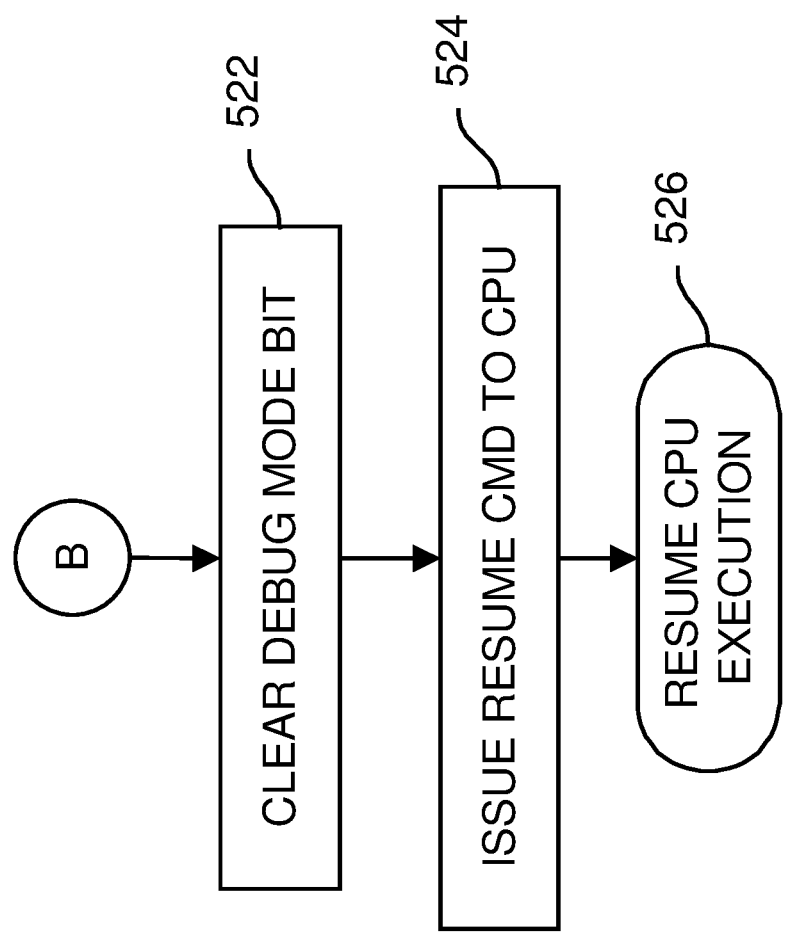

ENHANCED HARVARD ARCHITECTURE REDUCED INSTRUCTION SET COMPUTER (RISC) WITH DEBUG MODE ACCESS OF INSTRUCTION MEMORY WITHIN A UNIFIED MEMORY SPACE

FIELD OF THE INVENTION

This invention relates to computer architectures, and more particularly to debugging modes for Harvard architecture processors.

BACKGROUND OF THE INVENTION

Low-power or "green" applications tend to prefer using a Reduced Instruction-Set Computer (RISC) over a Complex Instruction-Set Computer (CISC) since the reduced instruction set tends to require less hardware and power. Die area is limited and expensive, so the added cost to implement complex instructions is often prohibitive.

One problem in program execution and debug is that a data write overwrites a program instruction by mistake. The address of a data write command may be incorrectly calculated, causing the write to occur within the memory area allocated for program or code memory, rather than to the memory area allocated for program data.

The Harvard architecture solves this data-overwriting-code problem by having separate memories and separate memory buses for instruction and for data. Data writes have an entirely separate address space, and use a different physical bus, than do program instructions.

Data reads and writes can only access the data memory, and program reads (instruction fetches) can only read the instruction memory. As further protection, the instruction memory cannot be written by the processor, since there is no write control signal between the processor and the instruction memory.

FIG. 1 shows a prior-art Harvard architecture. CPU 10 is a RISC Central Processing Unit (CPU) or other processor. CPU 10 has an instruction pointer that stores an instruction address that points to an address in instruction memory 26. CPU 10 sends the instruction address over instruction bus 30, and instruction memory 26 reads the instruction stored in program code 28 and sends the instruction back over data bus 20 to CPU 10, which then decodes this instruction and begins executing the instruction.

The fetched and decoded instruction may read (load) data. Then a memory address is generated by CPU 10, and this address is sent over data bus 20 to data memory 22, and the data stored at this address, in data area 24, is sent back over data bus 20 to CPU 10 for storage in a local register or for further processing. When the instruction writes (stores) data, the address and data are sent from CPU 10 to data memory 22 over data bus 20, and the data is stored in data area 24.

Having separate data bus 20 and instruction bus 30 allows for both data and instructions to be accessed at the same time. A traditional Von Neumann architecture computer that has a combined data and instruction memory will have stalls when both data and instructions are being accessed.

The Harvard architecture provides robust protection by having separate physical memories, instruction memory 26 and data memory 22, and even separate physical buses, instruction bus 30 and data bus 20. A data access instruction cannot access instruction memory 26 since that data access instruction causes an address to be sent over data bus 20, not over instruction bus 30.

While the Harvard architecture provides robust protection of the instruction memory space, debugging programs is difficult. During program debugging, sometimes it is desired to read the instruction memory or even to write the instruction memory, such as to add halt instructions at various program checkpoints. With the traditional Harvard architecture, this is not possible. Instructions to read data can only read data memory 22 using data bus 20. There is no way for an instruction to use instruction bus 30 to read or write instruction memory 26.

FIG. 2 shows a prior-art modified Harvard architecture. The modified Harvard architecture allows program code 28 to be read as data. Mux 34 is inserted onto instruction bus 30. Mux 34 permits CPU 10 to fetch instructions from instruction memory 26 and also allows instruction memory 26 to be read or written through data bus 20 to instruction bus 30. A read instruction executed by CPU 10 can generate an address that is sent over data bus 20, but this address is not present in data memory 22. Instead, this address is sent to arbiter and Memory Management Unit (MMU) 52, which decodes the address on data bus 20 and determines that the address is within instruction memory 26. Then arbiter and Memory Management Unit (MMU) 52 activates mux 34 to connect data bus 20 to instruction bus 30. This allows the address from data bus 20 to be sent through mux 34 to instruction memory 26. Instruction memory 26 responds by reading the instruction from program code 28, and this instruction is sent back over instruction bus 30, through mux 34 to data bus 20, and then read by CPU 10.

Instruction memory 26 may be changed to a dual-port memory to allow for near-simultaneous access by CPU 10 and by data bus 20. However, such dual-port memories are significantly more expensive. More likely a single-port memory will be used for instruction memory 26 and arbitration added to arbiter and Memory Management Unit (MMU) 52. When both CPU 10 and data bus 20 request access of instruction memory 26, then arbitration selects one requestor for immediate access and the other requestor has to wait. Such arbiters can be difficult to design and can reduce processor performance. The data access from data bus 20 may need to be stalled while instructions are being fetched over instruction bus 30.

Also, the modified Harvard architecture loses the robustness of the traditional Harvard architecture, since an address miscalculation could cause an instruction over-write by mistake.

FIG. 3 is a modified Harvard architecture that has an extended data space inside the instruction memory. In this variation of the modified Harvard architecture, mux 34 is used to store data in instruction memory 26. Extended data space 25 stores data within instruction memory 26. A data write instruction executed by CPU 10 causes the address and data to be sent over data bus 20, through mux 34 and onto instruction bus 30 for storage in extended data space 25 within instruction memory 26.

Extended data space 25 allows for more data to be stored than when only data area 24 in data memory 22 is available. Also, program code 28 can be pre-loaded through mux 34 during an initialization routine. Instructions can be read or written by data read/write instructions, as with the modified Harvard architecture of FIG. 2. However, the robust protection offered by the separate memory spaces of the traditional Harvard architecture of FIG. 1 is lost.

Various other modifications of the Harvard architecture have been proposed. The instruction memory may be a flash memory that is programmed through a Joint Test Action Group (JTAG) test interface where a 512-byte sector is erased and then bytes are written one by one. (US Pub. No. 2007/0300046). The CPU may have a Harvard architecture with separate instruction and data buses to separate level-1 and possibly level-2 caches, but then the level-3 caches and main memory are unified. (See U.S. Pat. No. 9,665,484). These modifications tend to increase complexity and cost and decrease robustness.

What is desired is a debuggable Harvard-architecture processor. A Harvard architecture processor having an execution mode that prevents data access of the instruction memory is desirable for robustness and performance, but that also has a debug mode that allows access of the instruction memory through the data bus is desirable for debugging. A Harvard-architecture processor with a debug module that has a debug interface to access the instruction memory within the data-memory space is desirable. It is desired to eliminate the arbiter for control of a mux on the instruction bus for better performance.

BRIEF DESCRIPTION OF THE DRAWINGS

FIGS. 7A-7B show a flowchart of a debug session that unifies the address space for debugging.

DETAILED DESCRIPTION

The present invention relates to an improvement in computer architecture. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Figure 1:
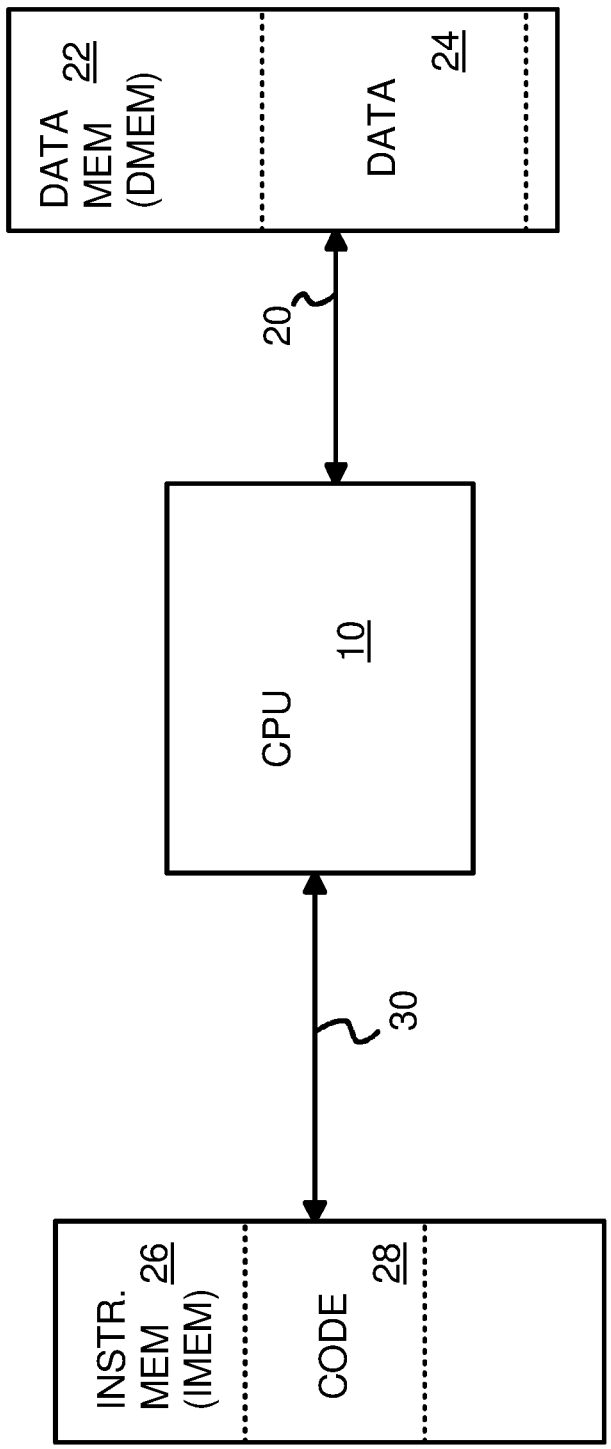
FIG. 1 shows a prior-art Harvard architecture.
Figure 2:
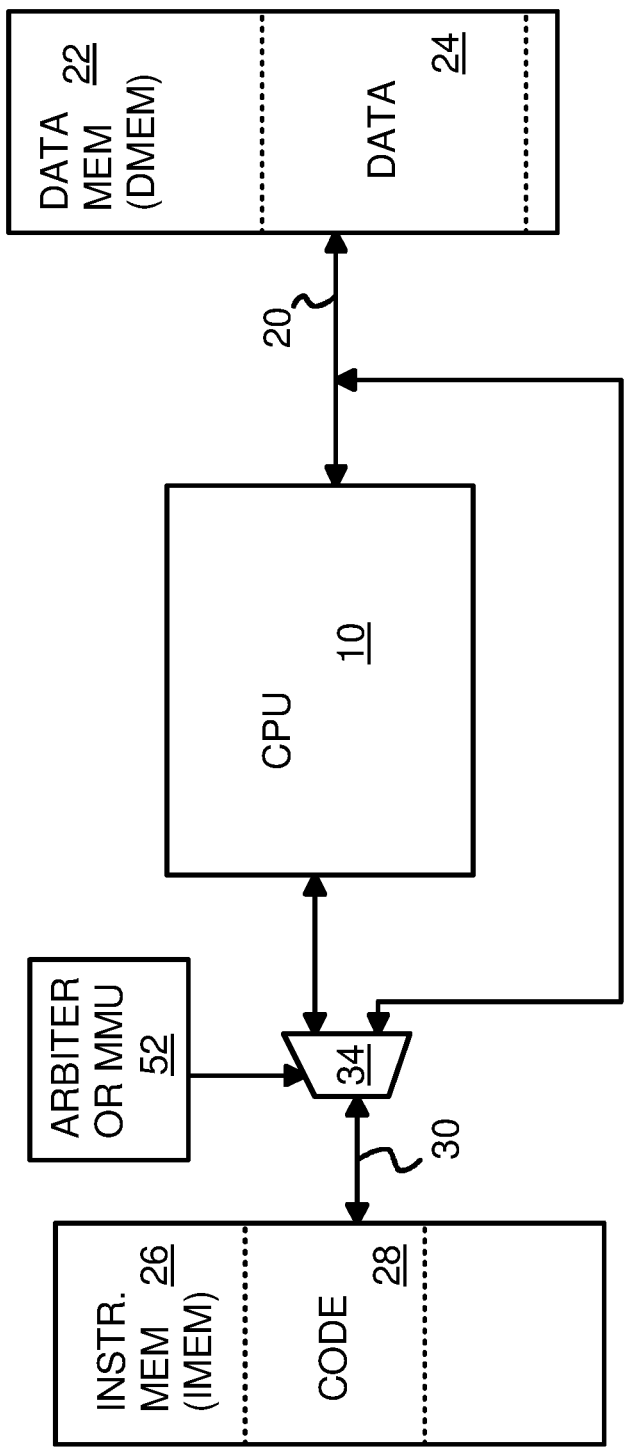
FIG. 2 shows a prior-art modified Harvard architecture.
Figure 3:
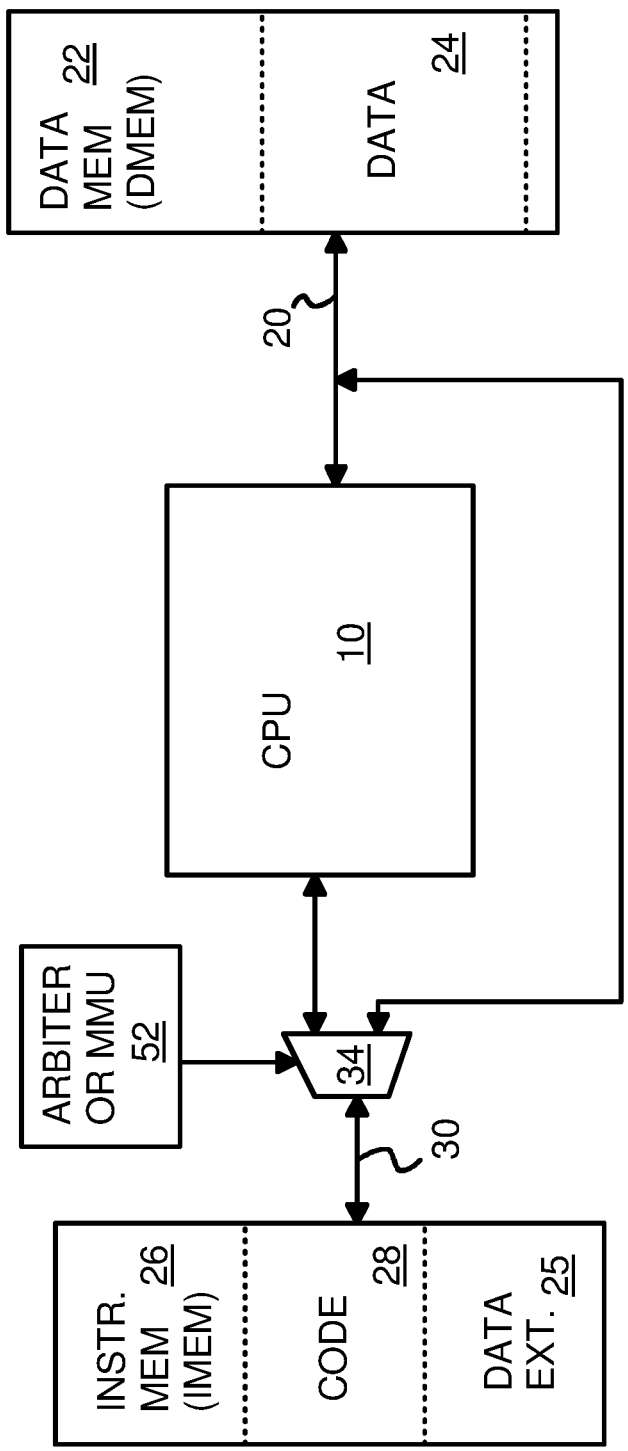
FIG. 3 is a modified Harvard architecture that has an extended data space inside the instruction memory.
Figure 4:
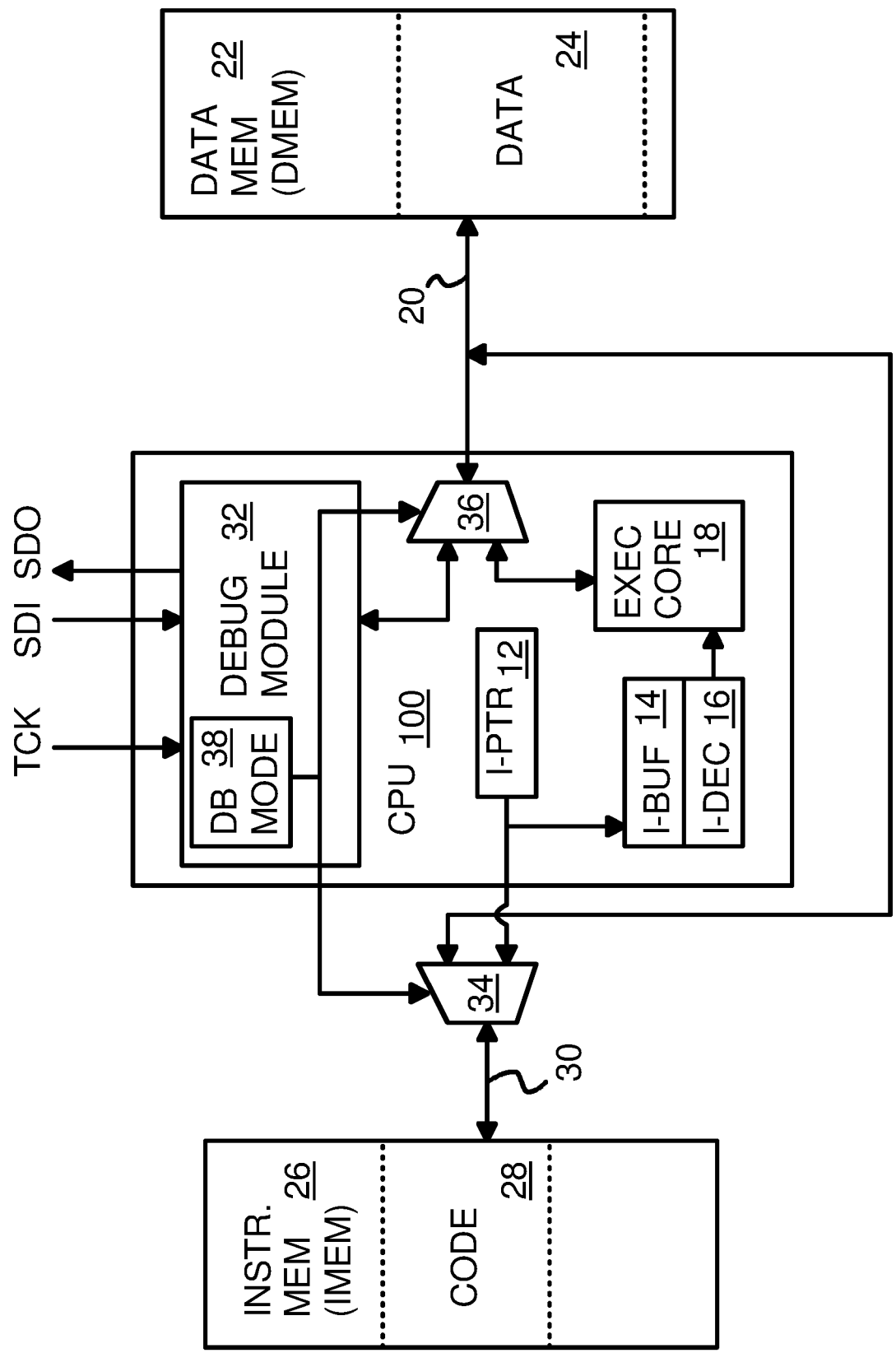
FIG. 4 is a block diagram of a Harvard architecture computer with a debug module that can access the instruction memory only during debug mode.

FIG. 4 is a block diagram of a Harvard architecture computer with a debug module that can access the instruction memory only during debug mode. Program code 28 is stored in instruction memory 26 while data memory 22 stores data in data area 24. CPU 100 accesses data in data memory 22 over data bus 20, and fetches instructions in instruction memory 26 over instruction bus 30.

During normal execution mode, CPU 100 sends the current value of instruction pointer 12 though mux 34 to instruction bus 30, where instruction memory 26 reads the instruction at that address and sends the instruction back over instruction bus 30 and mux 34 to instruction buffer 14. Instruction decoder 16 decode the instruction stored in instruction buffer 14, and performs a series of operations to execute that decoded instruction in execution core 18, which can be a pipelined execution unit with an Arithmetic Logic Unit (ALU), a load/store unit for accessing data in data memory 22, registers, and other execution hardware.

When the decoded instruction is a load instruction, then the load/store unit in execution core 18 generates a read command along with a memory address that is sent through mux 36 to data bus 20, allowing data memory 22 to read that address location and send the read data back over data bus 20 and mux 36 to execution core 18, which can write that read data into the local registers.

When the decoded instruction is a store instruction, then the load/store unit in execution core 18 generates a write command along with a memory address that is sent through mux 36 to data bus 20. Typically, a register in execution core 18 is read and that register data is also sent through mux 36 to data bus 20. Data memory 22 then writes that data at the memory location specified by the write address.

CPU 100 also has debug module 32 that allows an external debugger or other monitor to halt execution of instructions by execution core 18 and examine the state of CPU 100. CPU 100 is connected to the external debugger by an interface such as a serial test interface. Data bits can be scanned into CPU 100 through serial data input pin SDI, and serial data can be scanned out of CPU 100 through serial data output pin SDO. Test clock pin TCK can be pulsed to time the serial data transfers on SDI, SDO.

A certain sequence of SDI can activate debug mode and set the debug bit in debug mode register 38. Alternately an I/O pin or a combination of I/O pin states can be dedicated to set and clear debug mode register 38.

When debug mode register 38 has been set, muxes 34, 36 each select the upper input not the bottom input. Mux 34 connects instruction bus 30 to data bus 20 and disconnects instruction bus 30 from instruction pointer 12 and from instruction buffer 14. Also, the set debug mode bit in debug mode register 38 causes mux 36 to disconnect execution core 18 from data bus 20. Instead, debug module 32 is connected to data bus 20.

When the debug mode bit is set, mux 34 prevents instruction pointer 12 and instruction buffer 14 from accessing instruction memory 26. Instruction execution by execution core 18 cannot continue. Debug module 32 may send a halt command or other control signal to execution core 18 to halt execution when the debug mode bit in debug mode register 38 is set.

With execution core 18 halted, debug module 32 allows the external debugger to examine the current state. Data in data area 24 in data memory 22 can be read by debug module 32 sending an address and a read command through mux 36 to data bus 20, causing data memory 22 to read the data in data area 24 and send that data back over data bus 20 and through mux 36 to debug module 32. A data write could be performed to alter the state by the external debugger providing data through SDI that is then sent from debug module 32 through mux 36 and data bus 20 to be written into data memory 22.

Instructions may be read through muxes 36, 34. Debug module 32 sends the re-mapped instruction address through mux 36 to data bus 20, and then this address is sent through mux 34 to instruction bus 30. The instruction in program code 28 can be read by instruction memory 26, and the instruction sent back over instruction bus 30, through mux 34 to data bus 20, and then through mux 36 to debug module 32, which can send the instruction back to the external debugger through SDO.

Instructions could also be overwritten. The new instruction and its address can be sent from the external debugger over SDI to debug module 32, which re-maps the address and sends the re-mapped address and the new instruction over mux 36 to data bus 20, then through mux 34 to data bus 20. Instruction memory 26 then writes the new instruction into the address.

Figure 5:
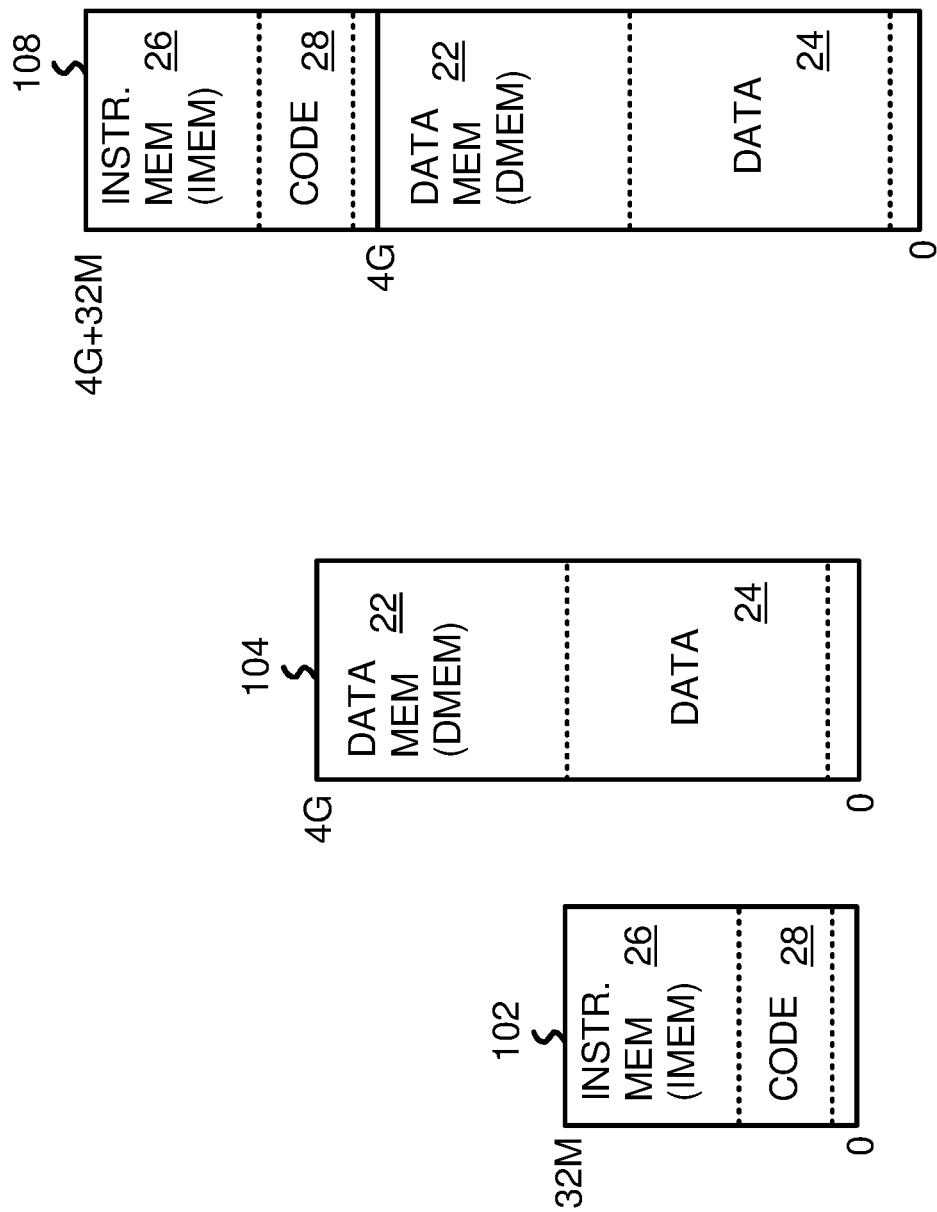
FIGS. 5A-5B show different address spaces for execution and for debug mode.

FIGS. 5A-5B show different address spaces for execution and for debug mode. In FIG. 5A, during normal CPU mode when execution core 18 (FIG. 4) in CPU is executing instructions, there are two separate memory spaces. Instruction memory space 102 can only be accessed by instructing fetches using the instruction address in instruction pointer 12, and the instructions read from program code 28 in instruction memory 26 are loaded into instruction buffer 14.

Data memory space 104 is not accessible nor is it visible to instruction pointer 12. During CPU execution mode when the debug bit is cleared in debug mode register 38, muxes 34, 36 disconnect their top inputs and only connect to their bottom inputs, so muxes 34, 36 block any connection between data bus 20 and instruction bus 30. Thus, two completely different address spaces exist during CPU mode, instruction memory space 102 and data memory space 104.

The load/store unit in execution core 18 can only access data in data memory 22 such as data area 24. Mux 34 blocks access of instruction memory 26 via data bus 20. Thus, data accesses cannot access or see instruction memory 26.

FIG. 5B shows a unified data and instruction memory space during debug mode. When the debug mode bit in debug mode register 38 is set, execution core 18 halts execution and instruction fetching stops. Muxes 34, 36 select their top inputs. Mux 36 connects debug module 32 to data bus 20, and mux 34 connects data bus 20 to instruction bus 30. Thus, both data memory 22 and instruction memory 26 can be accessed by debug module 32 through data bus 20 during debug mode.

Unified memory space 108 has data memory 22 at lower addresses, and instruction memory 26 at higher addresses. Debug module 32 has an address re-mapper that re-maps data address and instruction addresses. In one simple embodiment, an extra address bit is appended. The extra address bit is 1 for instruction addresses and 0 for data addresses.

The extra address bit is the Most-Significant Bit (MSB) while the data address or instruction address forms the Least-Significant Bits (LSBs). For example, a 32-bit data address space, such as data address space 104, has 4G data words. Instruction memory space 102 is smaller, having only 32M instructions, with a 15-bit address.

The re-mapper in debug module 32 appends a 0 to the data addresses, so a 32-bit data address such as 11101010 . . . 11 is re-mapped to 011101010 . . . 11 with 33 address bits. The re-mapper pads the upper bits with 0's to extend the 15-bit instruction address to the 32-bits of the data addresses, and then appends a 1. So, a 15-bit instruction address of 010-101 . . . 01 is re-mapped to 1000000000000000010-10101 . . . 01, a 33-bit address.

Thus, unified memory space 108 has data addresses at the bottom, and instruction addresses near the top of the address space. data memory 22 with data area 24 are accessed when the appended upper address bit is 0, while instruction memory 26 including program code 28 are accessed when this appended upper address bit is 1.

Two isolated memory spaces, instruction memory space 102 and data memory space 104, exist for normal CPU execution mode, providing robust data protection. CPU performance is high, since separate buses are provided to access data memory 22 and instruction memory 26. Stalls and arbitration delays are avoided.

During debug mode, instruction memory space 102 is remapped to an expanded memory space, unified memory space 108. Only debug module 32 can access unified memory space 108. Debug module 32 can access both data memory 22 and instruction memory 26 using unified memory space 108. Instructions may be written as well as read.

Figure 6:
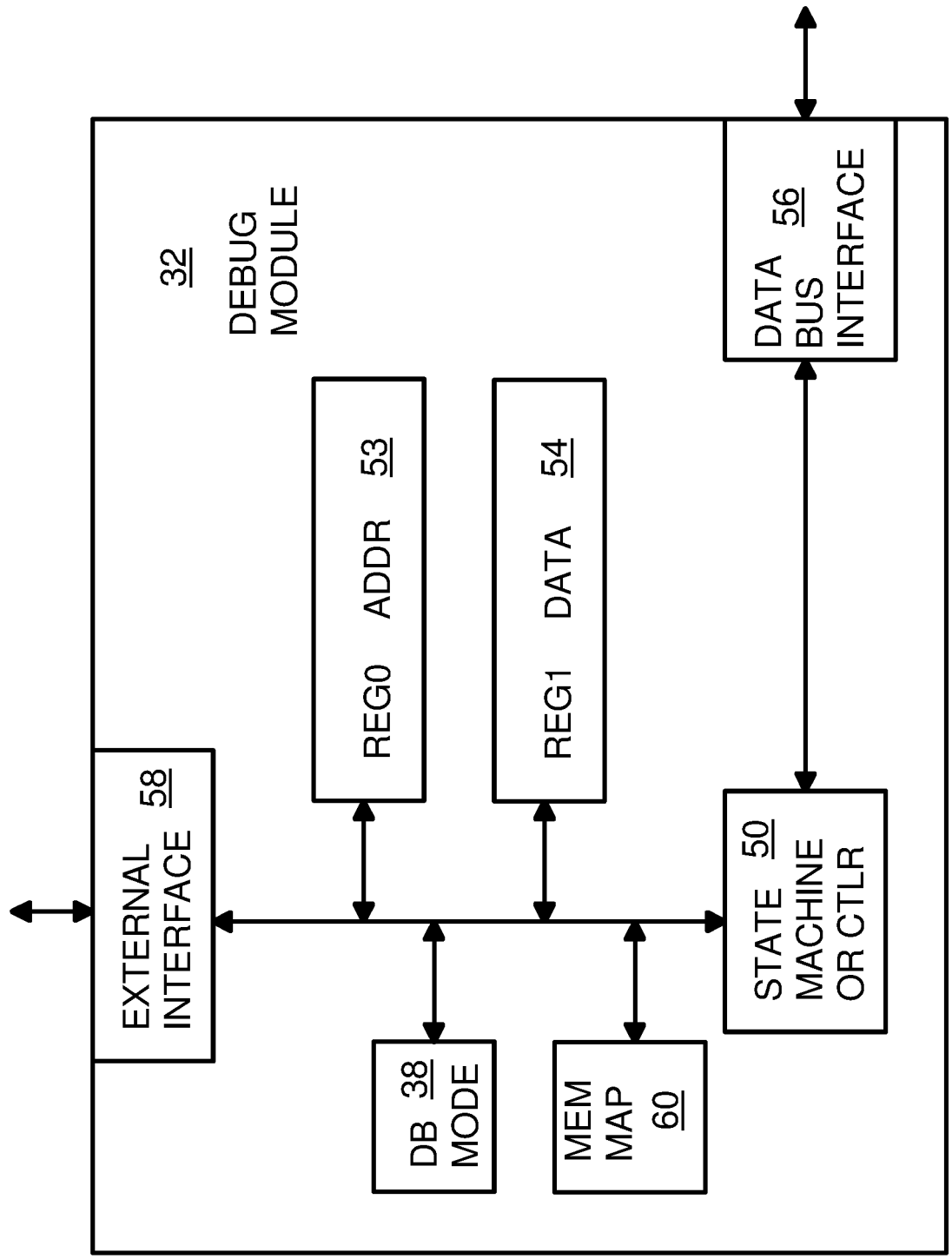
FIG. 6 is a diagram of the debug module inside the CPU.

FIG. 6 is a diagram of the debug module inside the CPU. Debug module 32 connects to an external debugger through external interface 58. External interface 58 can be a serial-data interface such as shown in FIG. 4 when there are limited available I/O pins on the Integrated Circuit (IC) package of the CPU. When the IC has extra pins available, then external interface 58 may be a parallel interface that allows for faster debugging.

When the external interface initiates a debugging session, it sets the debug bit in debug mode register 38. This debug bit controls muxes 34, 36 to select their upper inputs rather than their lower inputs. Also, debug module 32 may send a halt instruction or command to execution core 18 to halt instruction execution when the debug bit is set.

The external debugger may write an address to REG0 register 53 and write data to REG1 register 54. A write command may be written to another command register (not shown), or the external debugger may send a command to controller 50. Controller 50 can be a state machine that sequences through a series of states and operations to perform the write command. The address from register 53 and the write data from register 54 are sent through data bus interface 56 to mux 36 and then to data bus 20. Data memory 22 then writes this write data to the address specified on data bus 20. For a read operation, the data is read from data memory 22, sent back over data bus 20 through mux 36 to data bus interface 56, and then controller 50 writes this data into register 54. Later this data from register 54 can be sent to the external debugger through external interface 58.

When the external debugger reads an instruction, memory mapper 60 re-maps the instruction address stored in register 53, such as by appending a 1 bit to the MSB position. Then controller 50 sends this re-mapped address through data bus interface 56 and mux 56 to data bus 20. The upper address bit disables data memory 22 from responding to this address. Instead, mux 34 passes the lower address bits from data bus 20 to instruction bus 30 and enables instruction memory 26 to read this address. The instruction read from instruction memory 26 is then passed from instruction memory 26, back over instruction bus 30 to mux 34, then over data bus 20 and mux 36 to data bus interface 56. Controller 50 then writes this instruction into register 54. Later external interface 58 can send this instruction in register 54 back to the external debugger.

When the external debugger writes an instruction, external interface 58 stored the new instruction into register 54 and its instruction address into register 53. Memory mapper 60 re-maps the instruction address stored in register 53, such as by appending a 1 bit to the MSB position. Then controller 50 sends this re-mapped address and the new instruction from register 54 through data bus interface 56 and mux 56 to data bus 20. The upper address bit being =1 disables data memory 22 from responding to this address. Instead, mux 34 passes the new instruction and the lower address bits from data bus 20 to instruction bus 30, and enables instruction memory 26 to write the new instruction to this address.

When the debugging session ends, external interface 58 can write a zero to debug mode register 38. Muxes 34, 36 then select their lower inputs, causing instruction memory 26 to be inaccessible from data bus 20. Controller 50 can send a resume instruction or command to execution core 18 to allow instruction fetching and execution to continue. If the debugger over-wrote instructions or data, then these new instructions and data are used during subsequent execution.

Figure 7A:
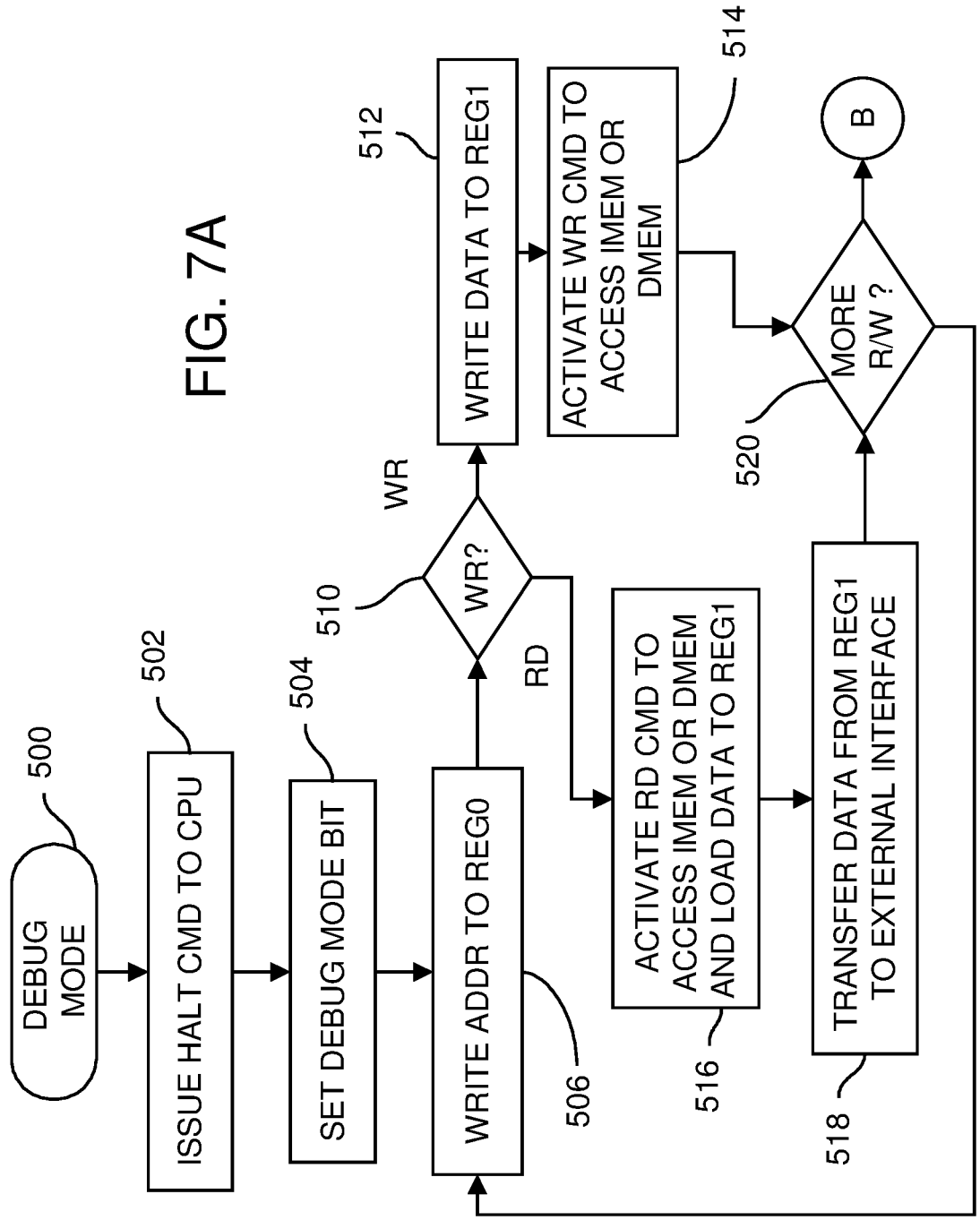

FIGS. 7A-7B show a flowchart of a debug session that unifies the address space for debugging. In FIG. 7A, an external debugger begins a debug session, step 500. A halt command is issued to the CPU, step 502. The external debugger can send a halt command to debug module 32, which can issue a halt command to CPU. This halt command causes execution core 18 to halt execution and forces instruction buffer 14 and instruction pointer 12 to stop instruction fetch.

The external debugger then uses external interface 58 (FIG. 6) to set the debug bit in debug mode register 38, step 504. The debug bit being set to 1 controls muxes 34, 36 to take their upper input and disconnect their lower inputs.

During the debug session, the external debugger uses external interface 58 to write an address to register 53, step 506. These address bits may be scanned in serially using SDI and TCK, or may be loaded in parallel when external interface 58 is a parallel interface. A command or status register may be written through external interface 58 with a read/write bit. When this read/write bit indicates a read, step 510, then controller 50 performs a series of operations to read memory. The address from register 53 is re-mapped, such as by examining a data/address bit in the command register and appending a 1 MSB when the bit indicates an instruction and appending a 0 MSB when the command bit indicates data.

When the appended MSB address bit is 0, then data memory 22 is read. Mux 36 connects debug module 32 to data bus 20, and data memory 22 returns the data, which is written into REG1 register 54, step 516. When the appended MSB address bit is 1, then instruction memory 26 is read. Mux 36 connects debug module 32 to data bus 20, and mux 34 connects data bus 20 to instruction bus 30. Instruction memory 26 returns the instruction, which is sent through muxes 34, 36 and written into REG1 register 54, step 516. The data or instruction in REG1 register 54 can then be sent over external interface 58 from debug module 32 to the external debugger, step 518.

When the command bit indicates a write operation, step 510, then the external debugger writes the new data or instruction to REG1 register 54, step 512. Controller 50 performs a series of operations to write the data to data memory 22 or the instruction to instruction memory 26.

The address from register 53 is re-mapped, such as by examining a data/address bit in the command register and appending a 1 MSB when the bit indicates an instruction and appending a 0 MSB when the command bit indicates data. When the appended MSB address bit is 0, then data memory 22 is written. Mux 36 connects debug module 32 to data bus 20, and the address from REG0 register 53 and the data from REG1 register 54 are sent from debug module 32, through data bus interface 56 and mux 36 to data bus 20, and data memory 22 is activated to write the data to the address sent over data bus 20, step 514.

When the appended MSB address bit is 1, then instruction memory 26 is written. Mux 36 connects debug module 32 to data bus 20, and mux 34 connects data bus 20 to instruction bus 30. The address from REG0 register 53 and the new instruction from REG1 register 54 are sent over this path to instruction memory 26, which writes the new instruction to that address, step 514.

When the debugger has more reads or writes to perform, step 520, then the process repeats from step 506 as new values are written into REG0 register 53 for reads, step 506, and REG0 register 53 and REG1 register 54 for writes, step 512.

Once the debugger has completed all reads and writes, step 520, then in FIG. 7B, the external debugger uses external interface 58 to clear the debug bit in debug mode register 38, step 522. Muxes 34, 36 select their lower inputs to connect to instruction bus 30 and data bus 20, respectively, and isolate their upper inputs. This separates instruction memory space 102 from data memory space 104.

A resume command or similar control signal is sent from debug module 32 to execution core 18, step 524. The CPU can continue normal program execution, step 526.

Alternate Embodiments

Several other embodiments are contemplated by the inventors. For example, many CPU's may be present in a multi-processor system, each with their own local data memory 22 and instruction memory 26. CPU 100 may have co-processors such as for graphics processing or other complex tasks. Data memory 22 an instruction memory 26 may be pre-loaded or managed using peripherals such as a hard disk or flash memory mass storage device that transfers data to data memory 22 when execution core 18 is halted or is otherwise blocked from accessing data memory 22. Various memory management systems may be included.

Muxes 34, 36 can be bidirectional and can be more complex switches. Addresses and data and command information may be passed through muxes 34, 36. Each of mux 34, 36 may mux several buses (address, data) as well as command or control signals (read/write, enables, strobes, latching or timing signals, etc.). Address and control signals such as R/W, enables, or strobes or other timing signals may pass through muxes 34, 36 in one direction, while data may pass through muxes 34, 36 in either direction.

While a simple serial data interface with TCK, SDI, SDO has been shown, debug module 32 could be accessed with a more complex interface, such as a parallel interface with more I/O pins. A simple one-wire interface or a RS-232 interface or an Ethernet interface could also be substituted.

While re-mapping the instruction address by adding 0's to extend the number of address bit in the instruction address to match the number of address bits in the data address have been described, these padding bits could be 1's or 0's or X's, since they can be stripped off and discarded by mux 34. Mux 34 could just pass the lower bits that match the width of the instruction address, and discard all upper address bits. The uppermost address bit can simply enable mux 34 to pass the address and command when =1, and disable mux 34 from passing addresses and commands to instruction memory 26 when =0. Many other variations of address re-mapping are possible. For example, translation tables or a Translation-Lookaside Buffer (TLB) could be used.

Debug module 32 could add just one extra address bit that is =1 for instructions and =0 for data. This extra address bit could select data memory 22 for access when =0, and select instruction memory 26 for access when =1. This extra select address bit could control mux 34 to disable passing the address through to instruction memory 26 when =0, and only pass the address through to instruction memory 26 when the select address bit is =1. This address bit and other control signals could be active-low rather than active-high. Inversions could be added.

While instruction memory 26 has been shown as being placed above data memory 22 in unified memory space 108, instruction memory 26 could appear below data memory 22 within unified memory space 108. Instruction memory 26 could also appear in a reserved area that is surrounded by data memory 22 or data area 24.

Mux 36 could support wider addresses than mux 34. The lower address bits of data bus 20 could be passed through mux 34 while the upper address bits that are part of data addresses but not part of instruction addresses are not passed through mux 34. More complex re-mappings and address translations are also possible.

Different sizes of address spaces and numbers of address bits could be substituted. The number of instruction addresses bits could be different than the number of data address bits, or they could be equal. The size of the physical memory may be less than the size of the address space. For example, the physical memory of data memory 22 may be only 1G, so the upper 3G are empty for an address space for 32 address bits.

More complex buffers, level shifters, or other components could be substituted or added. Inversions could be added at various locations. Hysteresis or other delays and output wave shaping could be added. Other kinds of buffer circuits, selectors, or muxes may be used.

The process steps of FIGS. 7A-7B could be rearranged, reordered, combined, or split in various ways. Some steps may take place in parallel rather than serially. Additional steps may be added. Controller 50 may have firmware to generate the low-level controls signals to control arbiter and Memory Management Unit (MMU) 52, data bus interface 56, external interface 58, reading and writing of registers 53, 54 and debug mode register 38, etc. Controller 50 may also have some software or a mix of firmware, hardware, and software. The halt and resume instructions may be instructions that are decoded by instruction decoder 16, or may be control signals that halt or pause operations of execution core 18 and/or other components, or that power-down execution core 18.

Instruction decoder 16 may decode an opcode in the instruction in instruction buffer 14 and identify operands in the instruction in instruction buffer 14 that modify the operation, or that identify one or more registers such as in a bank of General-Purpose Registers (GPR). Some instructions may point to another instruction that contains additional operands or information. A branching unit or branch predictor may be added to the fetching hardware.

While data bus 20 and instruction bus 30 have been described, CPU 100 could also have a third bus, such as to a third address space, and allow for 3 simultaneous memory accesses. While over-writing instructions during debug mode has been described, this ability to write to instruction memory 26 could be disabled during debug mode, and only permitted when specially enabled, such as by setting a write-instructions control bit in a control register in debug module 32.

Terms such as up, down, above, under, horizontal, vertical, inside, outside, are relative and depend on the viewpoint and are not meant to limit the invention to a particular perspective. Devices may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer comprising:
an execution core for performing operations to execute instructions;
a load/store unit in the execution core, for generating a data address;
a debug module having an external interface;
a debug mode register having a debug bit that is set through the external interface during a debug mode, and that is cleared for execution mode when the execution core is enabled to execute instructions;
a data-bus mux that connects the load/store unit to a data bus to a data memory when the debug bit is cleared, and that isolates the load/store unit from the data bus and connects the debug module to the data bus when the debug bit is set;
an instruction pointer that generates a sequence of instruction addresses;
an instruction buffer that stores an instruction fetched over an instruction bus from an instruction memory in response to an instruction address from the instruction pointer;
an instruction-bus mux that connects the instruction pointer and the instruction buffer to the instruction bus when the debug bit is cleared, and that isolates the instruction pointer and the instruction buffer from the instruction bus and connects the data bus to the instruction bus when the debug bit is set;
wherein during the debug mode the data-bus mux connects the debug module to the data bus, and the instruction-bus mux connects the data bus to the instruction bus, wherein the external interface in the debug module receives unified addresses from an external debugger;
wherein the debug module sends the unified addresses through the data-bus mux to the data bus and through the instruction-bus mux to the instruction bus;
wherein the debug module can access both the instruction memory and the data memory during debug mode.

2. The computer of claim 1 wherein remapped addresses for the instruction area deactivate the data memory and activate instruction memory to read instructions, wherein an instruction read from the instruction memory is transferred over the instruction bus, through the instruction-bus mux, over the data bus, and through the data-bus mux to the debug module.

3. The computer of claim 2 wherein when the remapped addresses is for an instruction write to the instruction area, the data memory is deactivated and the instruction memory is activated to write an instruction, wherein the instruction written to the instruction memory is transferred from the debug module, through the data-bus mux, over the data bus, through the instruction-bus mux, and over the instruction bus to the instruction memory.

4. The computer of claim 2 further comprising:
an instruction decoder that decodes an instruction in the instruction buffer and generates control signals to the execution core to control execution of the instruction.

5. The computer of claim 2 wherein the debug module further comprises:
a first register for storing an address received over the external interface;
a second register for storing write data received over the external interface, and for storing read data read from the data memory through the data-bus mux, and for storing an instruction read from the instruction memory over the instruction bus, through the instruction-bus mux to the data bus, and through the data-bus mux to the debug module.

6. The computer of claim 5 wherein the debug module further comprises:
a controller for controlling writing and reading of the first register and the second register and the external interface, and for transferring addresses from the first register to the data-bus mux, and for transferring data and instructions between the data-bus mux and the second register.

7. The computer of claim 6 wherein the debug module further comprises:
a data bus interface in the debug module for sending addresses to the data-bus mux, and for receiving data and instructions from the data-bus mux.

8. The computer of claim 2 further comprising:
a halt command, activated when the debug bit in the debug mode register is set, the halt command causing the execution core to halt execution of instructions during the debug mode.

9. The computer of claim 2 further comprising:
the data memory, connected to the data bus;
the instruction memory, connected to the instruction bus.

10. The computer of claim 9 wherein the data memory and the instruction memory are separate physical memory devices.

11. The computer of claim 1 wherein the external interface in the debug module further comprises:
a serial interface to the external debugger, wherein the external debugger transfers addresses and data as serial data over a serial data input and a serial data output that is synchronized to a serial clock signal.

12. A Harvard-architecture computer with a debug mode comprising:
an instruction memory for storing program code;
a data memory for storing program data;
a first switch;
an instruction bus between the first switch and the instruction memory;
a data bus to the data memory;
a processor Integrated Circuit (IC) which comprises:
a debug module having an external interface to an external debugger;
a debug mode register in the debug module, the debug mode register having a debug mode bit that indicates a debug mode;
a debug address register, in the debug module, for storing a debug address received from the external interface;
a debug data register, in the debug module, for receiving write data from the external interface, and for storing read data to be sent over the external interface;
an execution core for executing instructions;
a load/store unit in the execution core for generating a data address;
a register bank, accessible by the execution core, for storing data;
a second switch that connects the load/store unit to the data bus when the debug mode bit is not active, allowing the load/store unit to send the data address through the second switch to the data bus to the data memory, the second switch also sending write data from the register bank to the data bus for writing into the data memory for store instructions, the second switch transferring data read from the data memory and sent over the data bus to the register bank for load instructions;
the second switch disconnecting the load/store unit and connecting the debug module to the data bus when the debug mode bit is active;
an instruction pointer that generates an instruction address that is sent to the first switch;
an instruction buffer that receives an instruction read from the instruction memory and sent over the data bus through the first switch; and
an instruction decoder that decodes the instruction in the instruction buffer to control execution by the execution core;
wherein the first switch sends the instruction address from the instruction pointer over the instruction bus to the instruction memory, the instruction memory reading the instruction at the instruction address and sending the instruction over the instruction bus and through the first switch to the instruction buffer, when the debug mode bit is not active;
wherein when the debug mode bit is active, the first switch disconnects the instruction pointer and the instruction buffer from the instruction bus, the first switch connecting the instruction bus to the data bus when the debug mode bit is active;
wherein when the debug mode bit is active, the debug module accesses instructions in the instruction memory by sending the debug address through the second switch, the data bus, the first switch, and the instruction bus to the instruction memory;
wherein when the debug mode bit is active, the debug module accesses data in the data memory by sending the debug address through the second switch and the data bus, to the data memory, whereby the debug module is able to access instructions through the first switch and the second switch when the debug mode bit is activated.

13. The Harvard-architecture computer with the debug mode of claim 12 wherein when the debug mode bit is not active, the instruction memory is not accessible from the data bus and the data memory is not accessible from the instruction bus;

wherein instructions and data are in separate memory spaces when the debug mode bit is not active;

wherein when the debug mode bit is active, the instruction memory and the data memory are accessible from the data bus;

wherein instructions and data are in a unified memory space when the debug mode bit is active.

14. The Harvard-architecture computer with the debug mode of claim 13 wherein the first range of debug addresses is above an upper limit of the data memory;

whereby the instruction memory is remapped to debug addresses that are above a range of debug addresses to the data memory.

15. The Harvard-architecture computer with the debug mode of claim 12 wherein the first switch sends instruction addresses unidirectionally to the instruction bus and transfers instructions bidirectionally;

wherein the second switch sends data addresses unidirectionally to the data bus and transfers data bidirectionally.

16. The Harvard-architecture computer with the debug mode of claim 15 wherein the first switch sends a read-write control signal from the data bus to the instruction bus when the debug mode bit is active, the first switch driving the read-write control signal to disable writing when the debug mode bit is not active.

17. A debugable Harvard architecture computer system comprising:

an instruction memory for storing instructions;

a data memory for storing data;

an instruction bus connected to the instruction memory, the instruction bus carrying an instruction address to the instruction memory, the instruction bus carrying an instruction read from the instruction memory;

a data bus connected to the data memory, the data bus carrying a data address to the data memory and carrying data read from the data memory;

a processing core that receives the instruction and performs operations specified by the instruction, including a load operation that generates the data address and receives data that was previously stored in the data memory at the data address, the processing core also generating the instruction address;

a debug module having an external interface to an external debugger;

a debug mode register having a debug mode indicator that is active when the external debugger is debugging the debugable Harvard architecture computer system and that is inactive when the processing core is executing instructions;

a first switch between the processing core and the instruction bus, the first switch sending the instruction address from the processing core to the instruction bus to the instruction memory and returning the instruction read from the instruction memory and sent over the instruction bus to the processing core when the debug mode indicator is inactive;

when the debug mode indicator is active, the first switch isolating the processing core from the instruction bus, the first switch connecting the data bus to the instruction bus to allow access of the instruction memory through the data bus; and a second switch connecting the processing core to the data bus when the debug mode indicator is inactive, the processing core accessing the data memory by sending the data address through the second switch to the data bus, the processing core receiving data read from the data memory over the data bus and through the second switch;

when the debug mode indicator is active, the second switch isolating the processing core from the data bus, the second switch connecting the data bus to the debug module to allow the debug module to access the data memory through the data bus, and access the instruction memory through the data bus connected to the instruction bus by the first switch, wherein the debug module reads both the data memory and the instruction memory during a debug mode when the processing core is not executing instructions.

18. The debugable Harvard architecture computer system of claim 17 wherein the processing core further comprises:

a load/store unit that generates the data address;

an instruction pointer that generates a sequence of the instruction address;

an instruction buffer, connected to the first switch, for storing the instruction read from the instruction memory; and an instruction decoder that decodes the instruction stored in the instruction buffer to generate control signals that control instructions executing by the processing core.

* * * * *